L. I. Way. Insect Trap.

116652  PATENTED JUL 4 1871

Witnesses:
A. Benneckendorf
Wm. H. C. Smith

Inventor:
L. I. Way per _____ Attorneys.

No. 116,652

UNITED STATES PATENT OFFICE.

LYMAN I. WAY, OF ANNAWAN, ILLINOIS.

IMPROVEMENT IN INSECT-TRAPS.

Specification forming part of Letters Patent No. 116,652 dated July 4, 1871.

*To all whom it may concern:*

Be it known that I, LYMAN I. WAY, of Annawan, in the county of Henry and State of Illinois, have invented a new and useful Improvement in Insect-Trap; and I do hereby declare that the following is a full, clear, and exact description thereof, which will enable others skilled in the art to make and use the same, reference being had to the accompanying drawing forming part of this specification.

My invention consists in improving insect-traps, as hereinafter described and subsequently pointed out in the claim.

Figure 1:
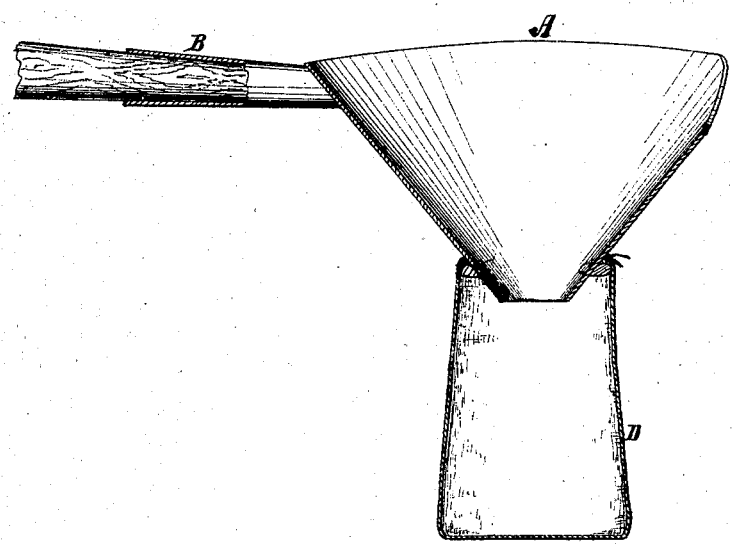
Figure 2:
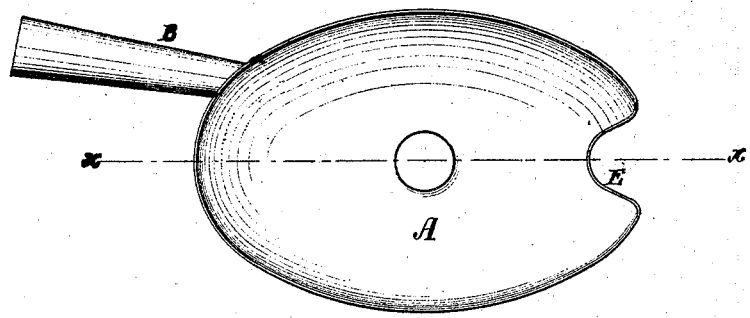

In the accompanying drawing, Figure 1 represents a vertical section of the trap taken on the line $x$ $x$ of Fig. 2. Fig. 2 is a top view.

Similar letters of reference indicate corresponding parts.

A is a recessed funnel, made of tin or other smooth metal or material, provided with a handle, B, and with a flange or collar, C, near its bottom or small end. D is a bag, made of cloth or other suitable flexible material, the mouth of which is secured to the funnel above the collar C, by tying or otherwise, so that it can readily be removed, as seen in the drawing. E is a recess in the rim of the funnel, which receives the stalk of the plant when the trap is applied. In this manner the funnel is made to partly surround the plant. Upon slightly jarring the plant the bugs or insects upon its leaves will fall into the funnel and slide down into the bag. When once in the bag, they cannot get out, as, if they crawl up the side of the bag, they cannot reach the projecting end of the funnel, and finally drop down. In this manner the trap may be carried from plant to plant, and applied until the bag becomes full or nearly full. Boiling water is then poured into the funnel, which destroys the insects. The bag is now removed from the funnel, its contents discharged; when it is replaced and is ready for a repetition of the operation.

In this manner the potato-field may, in a short time, be rid of these destroying pests. The trap may be applied to cucumber and other vines, as well as to other plants when infested with similar vermin. The remedy is cheap, simple, and effective.

Having thus described my invention, I claim as new and desire to secure by Letters Patent—

The funnel A B, having recess E, collar C, and bag D, the whole combined, arranged, and applied as and for the purpose specified.

LYMAN I. WAY.

Witnesses:
J. C. BLODGETT,
J. T. SHELHAMER.